UNITED STATES PATENT OFFICE 1,938,803

ACOUSTIC PLASTER

Harry E. Brookby, Evanston, Ill., assignor to United States Gypsum Company, Chicago, Ill., a corporation of Illinois No Drawing. Application June 4, 1927, Serial No. 196,639. Renewed June 21, 1930

6 Claims. (Cl. 106—20)

This invention relates to building material more particularly to a special plaster which may be applied to walls or ceilings and the like with ordinary plastering tools, and which when set or hardened will be highly sound absorbing.

The use of surface finishes containing connected pores for sound absorption is well known. Various methods to obtain the desired porosity have been devised such as the use of particular aggregates in the plaster, or in the mixing of the plaster on the job, or in applying the plaster to the walls or ceilings or the like which contains a substance which produces effervescence while on the wall before the plaster can harden. Each of these methods contain certain disadvantages either in application or preparation.

It is an object of this invention to provide a plaster which may be applied to walls or ceilings and the like using ordinary plastering tools, and which when set or hardened will be highly sound absorbing. Another object is to provide a plaster prepared for use by merely adding to the dry mixture a suitable gauging fluid.

The plaster which I have invented has three main ingredients: a bonding or cementing agent, an aggregate, and a gas liberating agent to produce connected porosity. As a bonding agent I use commercial calcined gypsum properly retarded by a commercial retarder. This retarder in the gypsum has a double function; that of retarder to control the time of set of the plaster so that it can be readily handled when being applied and used; and as a colloidal agent and gas retaining agent. In this latter use it has a decidedly helpful function in the production of the porosity of the plaster. For an aggregate I prefer to use a mixture of granulated pumice stone and marble. The use of the granulated marble will be more apparent as the use of a gas liberating agent is explained. For such an agent I prefer to use crystalline organic acids of which benzoic and oxalic acids are examples, although other similar crystalline acid reacting compounds may be used. Ordinarily if oxalic or benzoic acids are used the amount of acid will not exceed 1% of the weight of the plaster, the amount being varied as necessary. This gives a plaster consisting of calcined gypsum, retarder, granulated pumice stone, granulated marble and a crystalline organic acid, the whole being a dry mixture.

When the plaster is to be used, a suitable gauging fluid such as water is added to the dry mixture and the acid present in crystal form goes into solution. This acid solution of an organic acid and water then attacks the marble in the aggregate and the reaction releases carbon dioxide, $CO_2$. The amount of organic acid, however, is sufficient to decompose only a small portion of the marble in the aggregate, so the aggregate still remains a mixture of a nonabsorbent and an absorbent material. As the carbon dioxide gas is liberated by the action just described, it is immediately entangled in the mixture by the retarder in the calcined gypsum, the retarder being a very good gas entrainer. This action gives increased porosity to the plastic material and makes it more efficient as a sound absorbent over ordinary sound absorbent plasters depending upon porous or non-packing aggregates only. Also this gas liberation gives a very marked increased workability to the prepared acoustical plaster, so that it can easily be applied to walls, ceilings, etc. Thus the trade can apply this sound absorbent plaster with as good facility as ordinary sanded wall plasters which is not the case with sound absorbing plasters using pumice alone or an angular non-packing aggregate. By proper control of the organic acid and retarding agent for the gypsum base the porosity can be varied through a wide range. Commercially I prefer to so regulate these ingredients so that when the plastic composition is applied to walls, ceilings, etc. it has a sound absorbing coefficient averaging in excess of 30 over the five octave range from one octave below middle "C" to four octaves above middle "C".

Having thus described my invention what I claim is:

1. A sound-absorbent plaster for walls, ceilings and the like, comprising commercial retarded gypsum stucco and an organic water-soluble crystalline acid-reacting compound of the group consisting of oxalic acid and benzoic acid which are adapted to react with a carbonate to release carbon dioxide therefrom, and an aggregate of granulated pumice and granulated marble, the latter being present in an amount more than sufficient completely to neutralize said acid-reacting compound.

2. As a new article of manufacture a dry powdered absorbent plastering composition adapted to be used with the addition of water to form a set connectedly porous cementitious mass comprising a homogeneous mixture of commercial retarded gypsum stucco, a small percentage of oxalic acid and an aggregate of granulated pumice stone and granulated marble, the latter being present in an amount more than sufficient to neutralize completely said oxalic acid.

3. A sound-absorbent plaster consisting of a set mass having interconnected pores, and comprising the reaction product resulting from the gauging with water of a mixture comprising commercial retarded gypsum stucco, a small percentage of oxalic acid and an aggregate of granulated pumice stone and granulated marble, the amount of oxalic acid being insufficient to react with all the granulated marble.

4. A dry mix which on gauging with water will form a connectedly porous sound-absorbing plaster wall or ceiling, which comprises commercial retarded gypsum stucco, a mixed aggregate of granulated pumice and granulated marble, and benzoic acid in an amount insufficient to combine with all of the marble.

5. A dry mix that on gauging with water evolves carbon dioxide and sets to a connectedly porous sound-absorbing plaster surface which comprises commercial retarded gypsum stucco, granulated pumice and granulated marble, in admixture with a small amount of an acid selected from the group consisting of benzoic and oxalic acids, which acid is in an amount insufficient to react with all the marble present.

6. In the process of preparing a set porous gypsum product the step which consists of liberating carbon dioxide in situ within a mass of stucco and pumice by the interaction of marble and oxalic acid.

HARRY E. BROOKBY.